March 25, 1947.       H. C. CURTIS       2,417,813
CUTTING TOOL
Filed Oct. 29, 1945
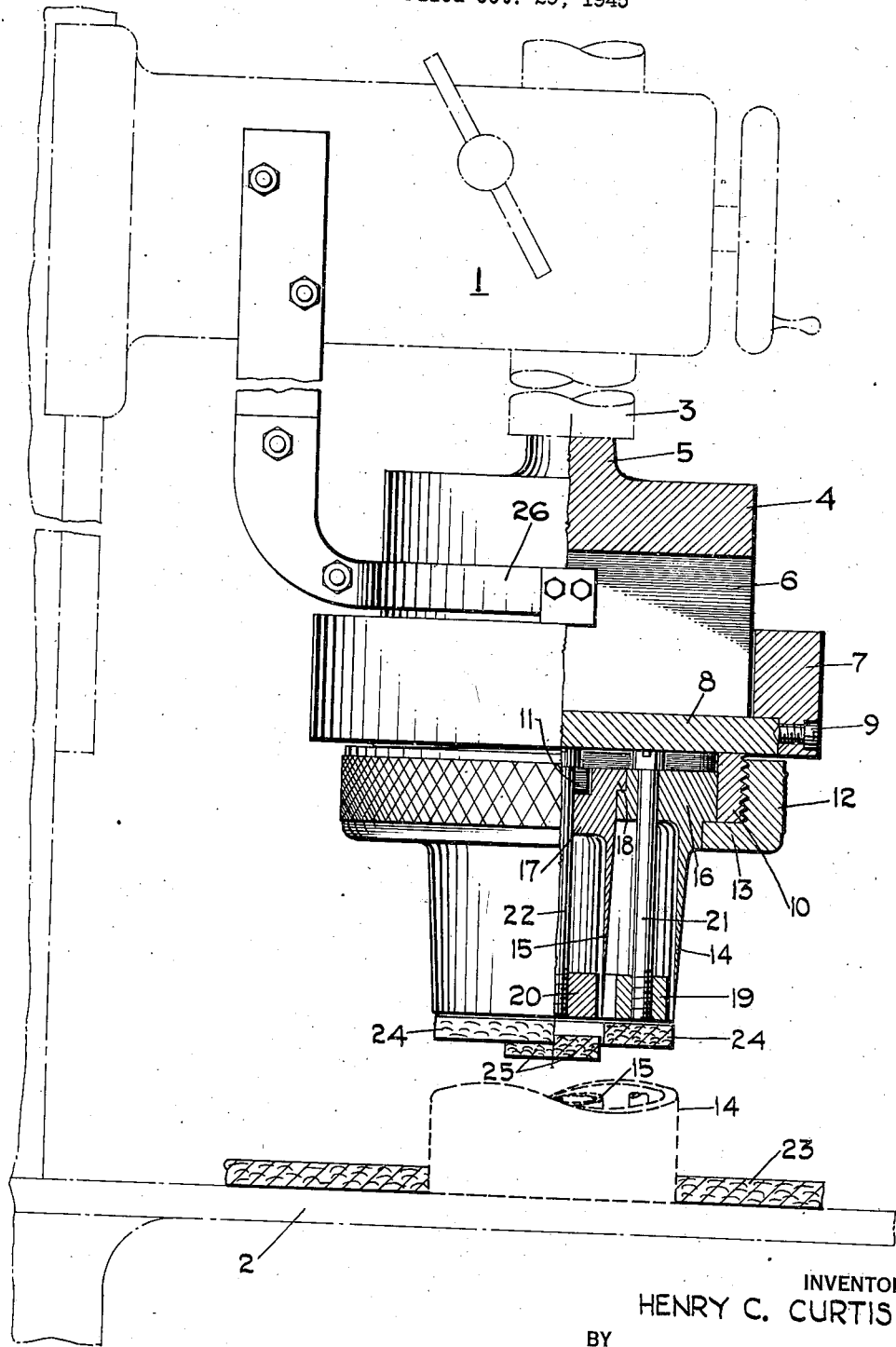
INVENTOR
HENRY C. CURTIS
BY
Ralph L. Chappell
ATTORNEY Patented Mar. 25, 1947

2,417,813

UNITED STATES PATENT OFFICE 2,417,813

CUTTING TOOL

Henry C. Curtis, Vallejo, Calif.

Application October 29, 1945, Serial No. 625,421

3 Claims. (Cl. 164—33)

(Granted under the act of March 3, 1883, as amended April 30, 1928; 370 O. G. 757)

This invention relates to a cutting tool and more particularly to a tool of this character which, on attachment to a suitable rotating fixture, forms elements of a desired circular shape.

It is an object of this invention to provide a cutting tool for cutting circular shapes.

A further object of this invention is to provide a cutting tool which is operated by attachment to the shaft of a drill press or other similar device.

Another object of this invention is to provide a cutting tool which may be operated continuously and which will eject the cut shape without stoppage of the machine or distortion of the shape.

Still another object of this invention is to provide a cutting tool of such structure as to permit the ready exchange of cutting heads of varying size.

In accomplishing these and other objects of the present invention, I have provided improved details of structure, the preferred form of which is illustrated in the accompanying drawing wherein The figure is a side elevation, partly in section, of a cutting tool embodying the features of the present invention mounted on the drill shaft of a conventional drill press.

Referring more in detail to the drawing:

A conventional drill press is shown generally at 1, it having a work support 2, and a drill shaft 3.

The cutting tool of this invention is suitably mounted in a conventional chuck (not shown) at the lower end of the shaft 3. The tool comprises a substantially cylindrical supporting member 4 provided with a spindle portion 5 and a longitudinal guiding slot 6 formed therein. A sliding collar 7 is fitted about the periphery of the member 4. A bar 8, passing through slot 6, is mounted within the collar 7, against opposing interior surfaces, by means of set screws, as at 9. This bar limits the movement of collar 7 to the pattern of slot 6.

The lower portion of the member 4 comprises a threaded annular extension 10 bounding a recessed portion. A depending key 11 is formed diametrically to the recess at the inner end thereof. A threaded collar 12, having a flanged portion 13 formed therein, is threadably engaged about the extension 10.

In the form of the device shown, a pair of concentric cylindrical cutting elements 14 and 15 are employed, which are provided with disk-like base portions 16 and 17, respectively. Base portion 16 fits within the recess provided in the lower portion of member 4, and is supported in place therein by means of the flange 13 on the collar 12. The base portion 17 is provided with a collar 18 which rests in an annular groove in its companion member 16 in the manner shown. The base portions 16 and 17 are each provided with a diametric key slot which, on proper alignment of these portions, forms a continuous key slot which engages key 11, whereby the free rotation of the base portions is prevented.

A ring shaped follower 19 is positioned between the cutters 14 and 15, and a second follower 20 is positioned interiorly of the cutter 15. Pins 21 (one of which is shown) mount the follower 19 and pin 22 mounts the follower 20. The pins 21 and 22 freely pass through openings in the base portions 16 and 17, respectively. Each pin is provided with an enlarged head portion to maintain the pins slidably engaged within the base portions 16 and 17. The head portions of pins 21 and 22 abut bar 8.

The work being cut is shown at 23, and the cutters 14 and 15 are indicated as engaging the work. The circular shapes produced by the particular form of apparatus described herein are indicated at 24 and 25, they here being shown as they are discharged from the apparatus as the cutter is raised above the work 23. A fixed fork 26 is mounted on the body of the drill in position to engage collar 7 when the apparatus is raised above the work 23, in the manner shown in the upper portion of Fig. 1.

In utilizing the cutting tool described herein, the tool is placed in rotary motion and is lowered against the work 23. The shapes cut from the work thereupon enter between the cutters 14 and 15, thereby forcing followers 18 and 19, pins 21 and 22, the bar 8, and collar 7, in an upward direction relative to the remaining portions of the cutting tool.

Once the cutters 14 and 15 have passed through the work 23, the cutting tool is raised to a position above the work. This act of raising the tool causes the shapes 24 and 25 to be expelled from the cutters, for collar 7 engages the fork 26 and is thereby held in position while other portions of the tool, including the cylindrical member 4 and the cutters 14 and 15, continue in an upward direction. Because of the relatively fixed relation between the collar 7 and the followers 19 and 20, the shapes 24 and 25 are thereby ejected from the cutters. The tool may then be lowered against an uncut portion of the work 23, thereby continuing the cutting and ejecting steps indefinitely, this without the necessity of stopping the rotary motion of the cutting tool.

Other cutting elements than 14 and 15 may be readily substituted for these elements, if desired. It is only necessary that the base portion of such element, or elements, be adapted to be properly held in position, and that the necessary cooperation obtain between the other members of the tool.

While I have shown but one embodiment of my invention, it is susceptible to modification without departing from the spirit of the invention. I do not wish, therefore, to be limited by the disclosures set forth, but only by the appended claims.

The invention described herein may be manufactured and used by or for the Government of the United States of America for governmental purposes without the payment of any royalties thereon or therefor.

I claim:

1. A tool for cutting circular shapes from a workpiece, comprising, a member having upper and lower surfaces, and having a slot extending therethrough along a transverse axis, together with a recessed portion in the lower surface thereof; means associated with the upper surface of said member to effect engagement between said member and a rotatable fixture of a power source; a slidable collar mounted about the periphery of said member; a bar passing through said slot, said bar being connected to opposing interior surfaces of said collar, and being freely movable in said slot along a longitudinal axis of said member; a cutting element having a circular cutting edge and a base portion, said base portion being receivable into said recessed portion; means cooperable with said member and said cutting element for holding said base portion in a relatively fixed position within said recessed portion; follower means mounted within said circular cutting edge and supported by pin means, said pin means passing freely through said base portion and having an end thereof abutting against the lower surface of said bar, and means for preventing said follower means from disengaging said tool.

2. A tool for cutting circular shapes from a workpiece, comprising, a cylindrical member having a spindle disposed centrally on one end thereof, a slot extending through said member along a horizontal axis thereof, and an extended annular threaded portion, enclosing a recess, at the other end thereof; a slidable collar mounted about the periphery of said cylindrical member; a bar passing through said slot, said bar being connected to opposing interior surfaces of said collar; a cutting element having a hollow, cylindrical portion mounted internally of the periphery of a base portion, said base portion being receivable into said recess; a threaded collar adapted to engage the extended annular threaded portion of said cylindrical member, said collar having an internal annular flange for engagement with the base portion of said cutting element whereby the latter is maintained in position in said recess; and a follower mounted within the hollow cylindrical portion of said cutting element, said follower being supported by pin means having an enlarged head, the portion of said pin means other than the head thereof passing freely through the base portion of said cutting element, and the head of said pin means abutting against a lower surface of said bar.

3. In combination with a rotatable driven member, a rotatable cutting tool for cutting circular shapes from a workpiece, said tool comprising a cylindrical supporting member adapted for engagement with said driven member; a hollow cylindrical cutting element mounted on said supporting member, an open circular end of said element serving as the cutting edge, and the longitudinal axis of said cutting element being in alignment with that of said driven member; a slidable collar mounted about the periphery of said supporting member; follower means supported within said cutting element; and supporting means for said follower means, said supporting means being arranged to slide said collar in a direction away from the cutting edge of the tool as the follower means are pressed inwardly of the cutting element; and means cooperable with said cutting tool for engaging said collar and causing the same to be relatively moved toward the cutting edge of the tool, thereby advancing said follower means toward said cutting edge from a position within said cylindrical cutting element.

HENRY C. CURTIS.

REFERENCES CITED

The following references are of record in the file of this patent:

UNITED STATES PATENTS

| Number | Name | Date |
| --- | --- | --- |
| 476,312 | Resche | June 7, 1892 |
| 1,997,843 | Warrell | Apr. 16, 1935 |
| 1,956,443 | Hertel | Apr. 24, 1934 |
| 1,270,038 | Malm et al. | June 18, 1918 |
| 1,150,279 | Little | Aug. 17, 1915 |
| 863,011 | Anderson | Aug. 13, 1907 |